UNITED STATES PATENT OFFICE.

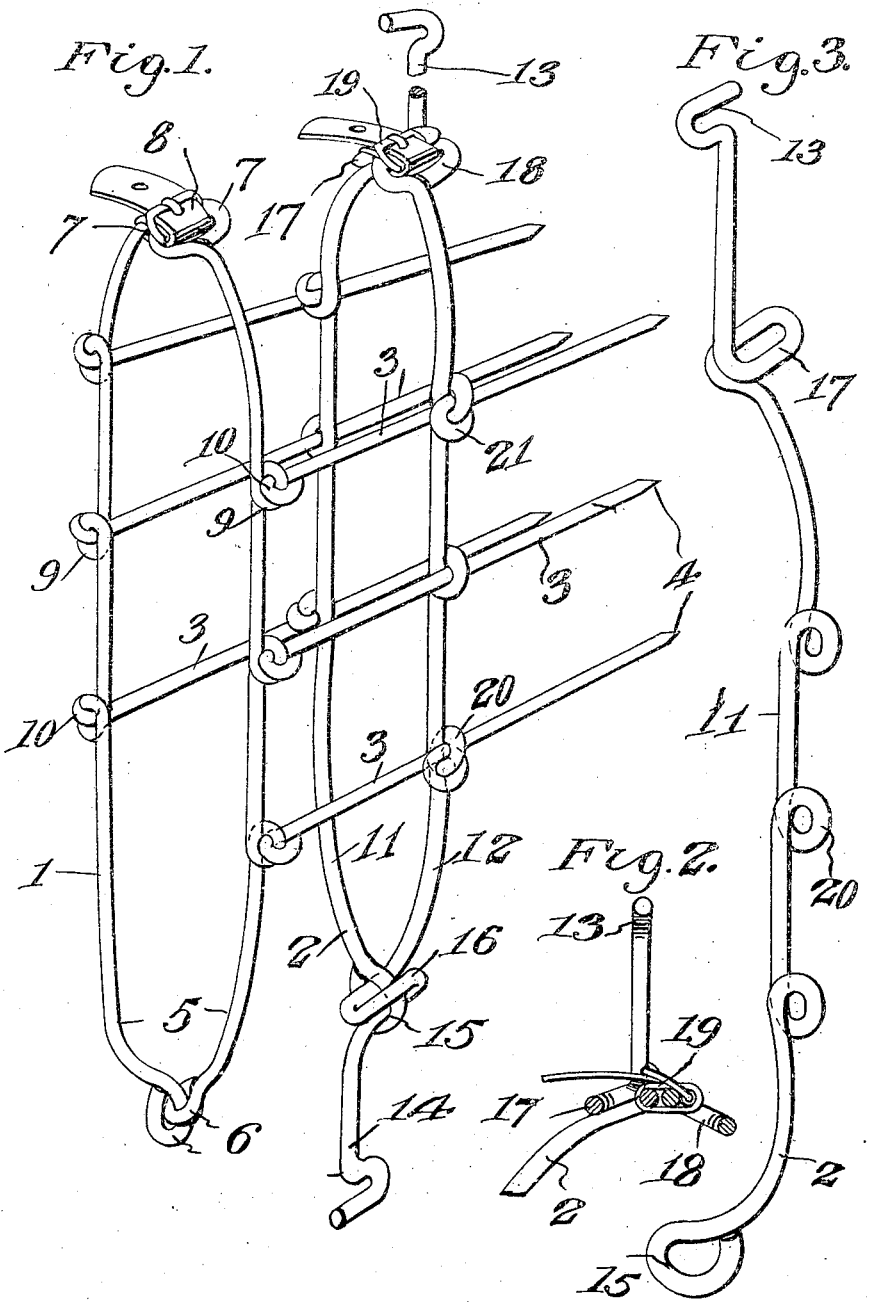

HOWARD S. WATROUS, OF FORT COBB, OKLAHOMA.

ANIMAL-POKE.

954,551.   Specification of Letters Patent.   Patented Apr. 12, 1910.

Application filed July 29, 1909. Serial No. 510,214.

*To all whom it may concern:*

Be it known that I, HOWARD S. WATROUS, a citizen of the United States, residing at Fort Cobb, in the county of Caddo and State of Oklahoma, have invented certain new and useful Improvements in Animal-Pokes, of which the following is a specification, reference being had to the accompanying drawings.

This invention relates to improvements in animal pokes and its object is to provide a simple and practical one which may be constructed at a small cost from heavy wire and which will be very effective in accomplishing its intended purpose.

With the above and other objects in view, the invention consists of the novel features of construction and the combination and arrangement of parts hereinafter fully described and claimed, and illustrated in the accompanying drawings, in which—

Figure 1 is a perspective view of my improved poke; Fig. 2 is a detail sectional view through the upper end of the same; and Fig. 3 is a detail perspective view of one of the side sections of the rear member.

My improved animal poke consists of front and rear collar members 1, 2 which are united by a plurality of link members 3 provided with spurs 4. The front member 1 consists of two half-sections 5 which are curved or bowed longitudinally in opposite directions so that together they form a band or collar to receive the animal's neck. These half-sections 5 are preferably formed from pieces of wire, the lower ends of which are bent to form hinge eyes 6, whereby the half-sections are loosely connected and may be swung apart at their upper ends to permit of the application of the device to the animal's neck. The upper ends of the half-sections 5 are formed with elongated loops or eyes 7 which are adjustably connected by means of a strap or buckle 8, as clearly shown in Fig. 1. This connection, it will be seen, permits of the adjustment of the member 1 for application to different sized animals. The intermediate portions of the sections 5 are bent to form loops or eyes 9 with which are engaged eyes 10 formed by bending the front ends of the connecting links 3, which latter are also preferably made of heavy wire. The rear collar member 2 is also composed of two half-sections 11, 12 which are similar to the sections 5 of the member 1 with the exception that the upper end of the section 11 is extended to provide a hook arm 13 and the lower end of the section 12 is similarly extended to provide a depending hook arm 14. The lower end of the section 11 is bent upon itself to provide an eye 15 which is loosely engaged by a loop or eye 16 formed by bending the section 12. A loop or eye 17, similar to the loop or eye 16, is formed by bending the upper portion of the section 11 and opposed to the loop or eye 17 is an elongated eye or loop 18 formed on the upper end of the section 12. The loops 17, 18 are adjustably united by a strap and buckle 19 or equivalent adjustable connections, whereby the rear collar member 2 may be varied according to the size of the animal on which the poke is used. The intermediate portions of the sections 11, 12 are formed with eyes 20 which receive the connecting links 3. Preferably three of these connecting links are arranged on each side of the device and the centrally arranged link of each series has its intermediate portion straight so as to slide through the intermediate eyes 20 but the intermediate portions of the uppermost and lowermost links 3 are bent to form eyes 21, which latter engage the uppermost and lowermost eyes 20, whereby the two collar members 1, 2 will be held in spaced relation but are loosely connected.

The rear ends of the links 3 are extended and pointed to form the spurs 4, which latter dig into the animal's neck and shoulders when it attempts to swing its head beyond a predetermined distance to either side and also when it attempts to pass over, under, or through a fence and the hooks 13, 14 engage portions of the fence, as is common in devices of this character.

From the foregoing it is thought that the use and advantages of the invention will be readily understood but it will be noted that owing to the simple construction of the device it may be produced at a very small cost and will be exceedingly strong and durable.

In practice, the sections 11, 12 of the rear collar member 2 are preferably made of heavier material than the sections 5 of the front collar member 1 so that the device when made of heavy wire will be substantial enough to effectively accomplish its intended purpose.

Owing to the adjustment above described it will be seen that the device may be readily applied to and adjusted upon different sized animals.

Having thus described the invention what is claimed is:

An animal poke comprising front and rear collar members, each consisting of half sections having their lower portions formed with loosely engaged eyes and their upper portions formed with loops, the intermediate or side portions of the half sections of each member being formed with series of oppositely disposed eyes, upper and lower hooks formed by extending the ends of the half sections of the rear collar member, adjustable straps uniting the loops of the opposing half sections of the collar members, and rigidly connecting links having their intermediate portions and forward end portions bent to form eyes which are loosely engaged with the eyes on the intermediate portions of the half sections of the two collar members, the rear ends of said links being extended and pointed to provide spurs.

In testimony whereof I hereunto affix my signature in the presence of two witnesses.

HOWARD S. WATROUS.

Witnesses:
ANGUS M. FLOWERS,
FRANK BAJDSTUN.